June 6, 1967     D. W. MUNGER     3,323,353
ULTRASONIC INSPECTION
Filed Nov. 21, 1963
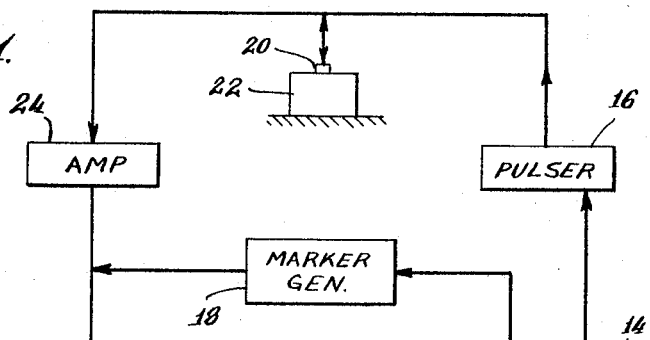
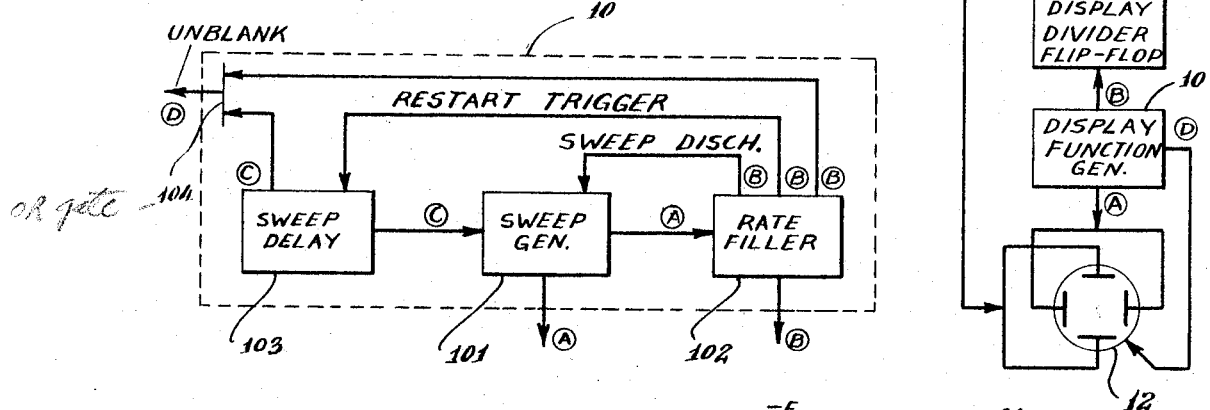
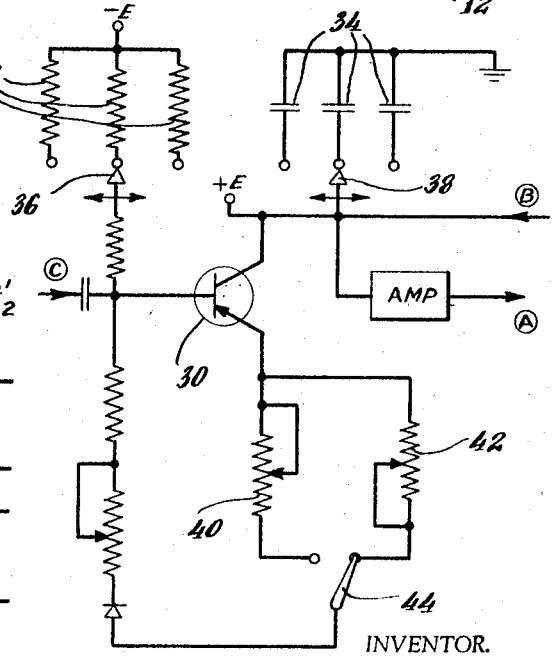
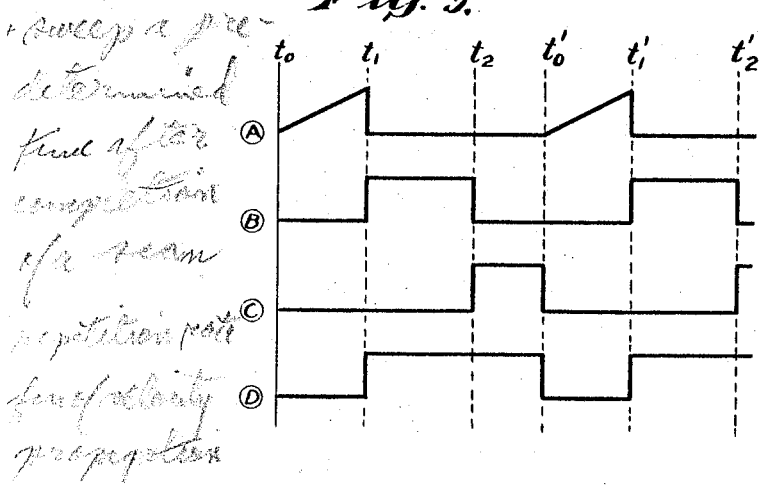
INVENTOR.
Donald W. Munger
BY Wooster, Davis & Cifelli
ATTORNEYS.

United States Patent Office 3,323,353
Patented June 6, 1967

3,323,353
ULTRASONIC INSPECTION
Donald W. Munger, New Milford, Conn., assignor to Automation Industries, Inc., El Segundo, Calif., a corporation of California
Filed Nov. 21, 1963, Ser. No. 325,294
11 Claims. (Cl. 73—67.8)

This invention relates to the inspection of objects by transmitting mechanical vibrations of ultrasonic frequency therein and receiving echoes from reflecting surfaces, such as defects, within the object. This method of testing has become a very important part of the manufacturing picture, particularly for the inspection of parts subject to operational strains.

One of the most common methods of utlizing this type of inspection is by means of a commerically packaged ultrasonic inspection unit. Such a unit customarily includes a piezoelectric crystal search unit for application to the object under test and a cathode ray oscilloscope for displaying the initial pulse and the ultrasonic echoes from defects within the object under test. Although the display may take several forms, it is most common in instruments of this type to form an "A" scan display. In an "A" scan, time is represented on a horizontal scale and the ultrasonic pulses form vertical spikes positioned along the horizontal base at distances proportional to the travel time of the ultrasonic wave through the test object. The customary method for generating the timing sequence for the pulser and the display is to utilize a master rate generator, such as a blocking oscillator or an astable multivibrator, to initiate the ultrasonic pulse and to provide triggering pulses for the sweep and sweep delay. The sweep circuit in an instrument of this type is used to form the horizontal time base for the oscilloscope display. The sweep delay is a circuit for delaying the presentation of the visual display for a predetermined length of time after the initial pulse to the piezoelectric transducer.

The method presently used has certain inherent disadvantages. One of these is that it allows "overlap" to appear on the display. Overlap occurs when the combination of the sweep length and the sweep delay time is greater than the repetition period. The "repetition period" is the length of time elapsing between consecutive driving pulses to the search unit. Another disadvantage of the prior art circuitry arises when a short sweep is combined with a long repetition period. When this occurs, the trace on the cathode ray oscilloscope becomes very dim. Another disadvantage of prior art ultrasonic instruments results from the calibration methods employed. Proper location of defects within a test object depends upon an accurate correlation between time and the velocity of the ultrasonic wave in the material. A marker circuit is customarily provided for applying to the face of the cathode ray tube a series of time-displaced marker traces positioned to indicate the distances travelled by the ultrasonic wave. As the velocity of the ultrasonic wave varies from material to material, the spacing between these marker traces must be varied to correspond with the particular material under test. Once this marker spacing has been determined, it would be desirable not to make further changes so long as the same material is being inspected. One method of ultrasonic testing, however, is known as immersion testing. In this technique, the object being inspected is immersed in a tank of water, or other suitable coupling fluid, and the transducer is suspended in the water and positioned to direct the ultrasonic wave into the object. It will be apparent that the presence of the water between the transducer and the object presents another variable which must be considered during the setup stages for calibrating the instrument. It would be desirable to have an instrument which could be utilized to indicate water path distances without disturbing the calibration for the particular material of the object being tested.

Accordingly, it is a primary object of this invention to provide improved ultrasonic inspection instruments. Other objects are to provide such an instrument having an improved "A" scan display; wherein automatic intensity control of the oscilloscope display is achieved; wherein no overlapping of the display occurs; and wherein measurements may be made under one set of calibrated conditions without disturbing a preset calibration for a different material.

The manner in which the foregoing objects are achieved will be more apparent from the following description, the appended claims, and the figures of the attached drawings, wherein:

FIG. 1 is a block diagram illustrating the circuit of an ultrasonic inspection instrument in accordance with this invention;

FIG. 2 is a block diagram of one portion of the circuit of FIG. 1;

FIG. 3 is a diagram illustrating the wave forms generated by the circuit of FIG. 2; and FIG. 4 is a schematic diagram of the sweep generator portion of the circuit of FIG. 2.

In the block diagram of FIG. 1, a display function generator 10, which will be described in more detail below, provides a saw-tooth wave form A to the horizontal plates of a cathode ray oscilloscope 12. The display function generator also provides an "unblanking" signal D to the grid of the cathode ray oscilloscope, to extinguish the return trace during the period between sweeps, and a synchronizing signal B to a display divider flip-flop circuit 14. The outputs of flip-flop 14 are fed to a pulser circuit 16 and a marker generator 18. The pulser circuit 16 provides a short radio frequency pulse to the ultrasonic search unit 20 which may be positioned in contact with a test object 22. This initial pulse is also applied to an amplifier 24. During the period following the application of the initial pulse, ultrasonic echoes received from defects within object 22 are converted to electrical signals by search unit 20 and are also applied to the amplifier 24. The output of the amplifier 24 and marker generator 18 are applied in parallel to the vertical plates of cathode ray oscilloscope 12. It will thus be seen that the outputs of the amplifier and the marker generator are in time-sharing relationship with one another and appear alternately on the face of the cathode ray tube.

For a full understanding of the operation of the circuit of FIG. 1, reference may be had to FIG. 2, which illustrates the display function generator 10, and to FIG. 3, which illustrates the various wave forms it produces. The objectives of automatic intensity control and stable non-overlapping "A" scan displays are achieved by means of three direct-coupled generators: a sweep generator 101, a "rate filler" generator 102, and a "sweep delay" generator 103. The sweep generator 101 is a saw-tooth generator which provides sweep control voltage of the type illustrated at "A" of FIG. 3 for controlling the horizontal plates of the cathode ray oscilloscope. Each of the rate filler generator 102 and the sweep delay generator 103 is a monostable multivibrator. In addition to the three generators, there is also provided an "OR" gate 104 for providing the unblanking signal D.

The circuit of FIG. 2 operates as follows: When power is applied, the sweep delay generator 103 and the rate filler generator 102 go into their stable states. The sweep generator 101 begins to generate a saw-tooth voltage. The time of application of power to this circuit may be considered time $t_0$ of FIG. 3. As the output voltage "A"

of the sweep generator 101 continues to increase, it is applied to the rate filler generator 102. Upon reaching a certain preselected value, the applied voltage A causes the rate filler generator 102 to change to its temporarily stable state at time $t_1$. A feed back signal entitled "Sweep Discharge" in FIG. 2, resets the sweep generator 101 to its "off" state and continues to hold the sweep generator in this position for so long as the monostable condition exists. After the time lapse, $t_1$–$t_2$, provided by the timing constants of the rate filler generator 102, this circuit reverts to its stable condition and thereupon energizes the sweep delay generator 103 through the "Restart Trigger" connection. At time $t_2$, accordingly, the sweep delay generator 103 goes into its temporarily stable state and produces an output signal C which continues to prevent the operation of the sweep generator 101. At time $t_0'$ the sweep delay generator 103 reverts to its stable state and the sweep generator 101 once more begins to generate its saw-tooth output A, causing the cycle to repeat.

By reference to FIG. 1, it will be noted that the output B is, in effect, a synchronizing signal which alternately activates the pulser 16 and the marker generator 18. It will thus be seen that the circuit of FIG. 2 automatically adjusts the pulse rate of the ultrasonic inspection instrument for maximum brilliance of display, compatible with the test being made. When the sweep length ($t_0$–$t_1$) is of short duration, the time period $t_0$–$t_0'$ is compressed and the pulse rate is high. Since a short time is needed for the sweep, many more pulses per second can be transmitted. This high pulse rate is needed in order to keep the trace bright as it would otherwise become dim at the fast sweep speed. When the sweep length is long, however, the pulse rate is automatically lowered. This allows time for the entire sweep to be displayed before another pulse is initiated.

The OR gate 104 or a similar logical device, such as a buffer circuit, receives the output signals of the rate filler 102 and the sweep delay 103. Its output D is applied to the grid of the cathode ray tube so as to deactivate the trace except during the sweep (or marker) period as is illustrated in FIG. 3.

FIG. 4 is a schematic diagram of sweep generator 101 and illustrates still another improvement provided by this invention. In the circuit of FIG. 4, a transistor 30 is connected as a saw-tooth oscillator. The circuit includes banks of sweep-timing resistors 32 and multiplying capacitors 34 which may be selectively inserted into the circuit by means of multiple position switches 36, 38. These switches may be operated from the front of the control cabinet so that the operator of the instrument may select a sweep length corresponding to a desired path length in the materials being inspected. Calibration of this sweep length to correspond to a particular material being investigated is accomplished by means of potentiometers 40 or 42 which may be selectively inserted into the circuit by operation of selector switch 44. The selector switch 44 and the control for potentiometer 40 are both mounted on the cabinet for operation by the user; however, potentiometer 42 is internally adjusted and would normally be factory preset. Potentiometer 42 is adjusted so that the sweep length is automatically calibrated for the velocity of sound in water—water being the fluid most commonly used for immersion testing. Potentiometer 40, on the other hand, is dial adjusted and the dial is calibrated both in numerical velocities and by the name of the material under test. By operation of selector switch 44, the instrument may be calibrated for the water path distance and adjustment may be made to the "material" potentiometer 40 without affecting the water path calibration.

It is also possible to utilize the novel "rate filler" generator without using the sweep delay generator. With this type of operation, the time period between $t_2$ and $t_0'$, shown in FIG. 3, would be omitted. The sweep delay generator 103 of FIG. 2 and the corresponding "Restart Trigger" connection would not be required. The free running sweep generator characteristics would be maintained by utilizing the output A from sweep generator 101 to rate filler 102 and the "Sweep Discharge" feedback.

It will be obvious from the foregoing description that the present invention has resulted in a number of advantages and improvements over devices known to the prior art. Also it will be apparent to those skilled in the art that a number of modifications and changes may be made in this invention without departing from its spirit and scope. Accordingly, it is to be understood that the foregoing description is illustrative only, rather than limiting. This invention is limited only by the scope of the following claims.

What I claim as new and desire to secure by Letters Patent of the United States is:

1. A function generator for an oscilloscope display which comprises: a sweep generator arranged to produce a variable output voltage for activating the time base portion of said display; a first monostable circuit in receiving relationship to said variable output voltage and connected to be changed into its temporarily stable state when said output voltage reaches a preselected level; first sweep shutoff means interconnecting said first monostable circuit and said sweep generator to suppress said output voltage during said temporarily stable state; a second monostable circuit in receiving relationship to the output of said first monostable circuit and arranged to be changed into its temporarily stable state upon each reversion of said first monostable circuit to a stable state; and second sweep shutoff means interconnecting said second monostable circuit and said sweep generator to suppress said output voltage during the temporarily stable state of said second monostable circuit.

2. The generator of claim 1 wherein said sweep generator is a saw-tooth oscillator.

3. The generator of claim 2 wherein each of said first and second monostable circuits is a monostable multivibrator.

4. A function generator for an oscilloscope display which comprises: a sweep generator arranged to produce a variable output voltage for activating one coordinate of said display; a first monostable circuit in receiving relationship to said variable output voltage and connected to be changed into its temporarily stable state when said output voltage reaches a preselected level; first sweep shutoff means interconnecting said first monostable circuit and said sweep generator to suppress said output voltage during said temporarily stable state; a second monostable circuit in receiving relationship to the output of said first monostable circuit and arranged to be changed into its temporarily stable state upon each reversion of said first monostable circuit to a stable state; second sweep shut off means interconnecting said second monostable circuit and said sweep generator to suppress said output voltage during the temporarily stable state of said second monostable circuit; and OR circuit means connected to receive the outputs of both of said first and second monostable circuits and extinguish the scanning beam of said oscilloscope during the temporarily stable state periods of either of said monostable circuits.

5. Ultrasonic inspection apparatus which comprises: a sweep generator circuit including a saw-tooth generator for generating a varying output voltage during each of a plurality of first time periods of selectively variable length, first timer means responsive to the output of said saw-tooth generator to establish a second time period beginning with the end of each of said first time periods, and second timer means responsive to the output of said first timer means to establish a selectively variable third time period beginning with the end of each of said second time periods and arranged to initiate the successive first time period of said saw-tooth generator upon the termination of said third time period; a pulser circuit arranged to generate a radio frequency electrical pulse at the beginning of the third time period; connection means interconnecting the output of said second timer means and the input of said pulser means; ultrasonic transducer means connected to receive said electrical pulse to generate a vibrational pulse of ultrasonic frequency therefrom and adapted to convert vibrational echo pulses into corresponding electrical echo signals; and a cathode ray oscilloscope having at least a first set of deflection plates connected to be energized by the varying output voltage of said saw-tooth generator and a second set of deflection plates connected to be energized by the electrical echo signals from said transducer means.

6. The apparatus of claim 5 wherein said connection means is a flip-flop circuit energized from said second timer means at the beginning of each successive third time period and having a first output connected to energize said pulser means.

7. The apparatus of claim 6 wherein a marker generator is connected to be energized by the second output of said flip-flop circuit and is connected to energize said second set of deflection plates.

8. The apparatus of claim 5 wherein said saw-tooth generator comprises: first and second independently adjustable sweep speed control means; and selector switch means connected to selectively alternatively insert either of said first and second sweep speed control means into the circuit of said saw-tooth generator.

9. An ultrasonic tester for inspecting a workpiece, said tester including the combination of
transducer means for being coupled to the workpiece,
transmitter means coupled to the transducer means for energizing the transducer means whereby pulses of ultrasonic energy are transmitted into the workpiece,
receiver means coupled to the transducer means for receiving pulses of energy reflected from the workpiece,
a cathode ray tube having first and second deflection means, said first deflection means being coupled to said receiver means and effective to produce a displacement of the electron beam in a first direction in response to the signals from the receiver means,
a sweep generator for generating an intermittently occurring sweep signal having a substantially linear rate of change, said sweep generator being coupled to the second deflection means for scanning the electron beam in the second direction across the tube at a substantially linear sweep speed,
control means coupled to said generator for varying said rate of charge of said sweep generator to thereby correlate the scan speed of the electron beam in the second direction with the velocity at which the ultrasonic energy propagates through the workpiece, and
delay means responsive to the completion of a scan in said direction, said delay means being coupled to the sweep generator and to the transmitter means for intermittently energizing the transmitter means and the sweep generator a predetermined time following the completion of a scan across the tube in the second direction, whereby the repetition rate at which the pulses of ultrasonic energy are transmitted by the transducer is a function of the scan speed and propagation velocity of the ultrasonic energy through the workpiece.

10. An ultrasonic tester for inspecting a workpiece, said tester including the combination of
transducer means for transmitting ultrasonic energy into the workpiece and receiving echoes of said energy reflected from within the workpiece,
pulse means coupled to the transducer means for intermittently causing the transducer means to transmit pulses of said ultrasonic energy at a pulse repetition rate,
a cathode ray tube coupled to said transducer means and effective to produce a first direction in displacement in response to the signals received by the transducer,
a sweep generator coupled to the cathode ray tube for scanning the electron beam in a second direction across the tube at a substantially linear scan sweep speed, and
control means coupled to the sweep generator and effective to vary the scan sweep speed as a function of the velocity at which the ultrasonic energy propagates through the workpiece, said pulse means being coupled to the sweep generator and effective to energize the transducer means after the completion of a scan whereby the scan sweep speed and the pulse repetition rate are a function of the velocity of propagation.

11. An ultrasonic tester for inspecting workpieces wherein ultrasonic energy propagates therethrough at a velocity dependent upon the composition of the workpiece, said tester including the combination of,
a cathode ray tube having deflection means,
a sweep generator coupled to said deflection means for scanning the electron beam across said tube at a linear sweep speed,
ultrasonic means adapted to be coupled to the workpiece for repetitively transmitting pulses of ultrasonic energy into the workpiece and receiving echoes of said energy, said ultrasonic means being coupled to the deflection means,
means coupled to the sweep generator and effective to vary the sweep speed as a function of the velocity of propagation of the ultrasonic energy through the workpiece, and
trigger means coupled to the ultrasonic means and to the sweep generator, said trigger means being effective to trigger the ultrasonic means a predetermined time after said electron beam has scanned across said tube whereby the repetition rate at which said ultrasonic pulses are transmitted into the workpiece is a function of said sweep speed.

References Cited
UNITED STATES PATENTS

| 2,461,543 | 2/1949 | Gunn | 73—67.5 X |
| 3,005,961 | 10/1961 | Wallace | 328—185 X |
| 3,153,928 | 10/1964 | Uphoff et al. | 73—67.8 |
| 3,156,111 | 10/1964 | Joy | 73—67.9 |
| 3,167,709 | 1/1965 | White et al. | |
| 3,220,249 | 11/1965 | Posakony | 73—67.8 |

JAMES J. GILL, *Acting Primary Examiner.*

RICHARD C. QUEISSER, *Examiner.*